Patented Sept. 6, 1938

2,128,926

UNITED STATES PATENT OFFICE 2,128,926

TREATMENT OF SOYA BEAN OIL

Albert K. Epstein, Chicago, Ill.

No Drawing. Application April 15, 1937,
Serial No. 137,046

34 Claims. (Cl. 260—420)

My invention relates to the treatment of certain types of oils, especially soya bean oil, and is particularly concerned with improving the quality thereof whereby its utility in the field of edible oils and fats is markedly increased.

It has been known for some considerable time that edible soya bean oil, including edible soya bean oil which has been refined, bleached and deodorized under the best existing commercial methods, undergoes a type of spoilage which is characterized as "reversion" when exposed to light and air and, even though somewhat more slowly, when stored in the absence of light and air. This reversion manifests itself in an acquisition by the soya bean oil of various off-flavors such as "beany" flavor, or sometimes described as fishy, which subsequently often become intensified and altered with the production of other undesirable flavors described as "oleo" and "grassy" or "fishy". This type of spoilage is characteristic of soya bean oil. Even when edible, refined, bleached and deodorized soya bean oil is subjected to hydrogenation to produce a product having a melting point of from about 95° F. to 100° F., said partially hydrogenated oil also reverts, particularly when exposed to air and light, after a few days and acquires an oleo-like flavor which becomes intensified with time. Even when the oil is kept in the dark, the above type of spoilage occurs in the bean oils in the course of time.

As a result of the disadvantageous properties of soya bean oil, as briefly described above, considerable difficulties and objections have been encountered in utilizing this oil in the food industries, such as in salad oil and particularly in dry plastic shortenings and in margarine. In the manufacture of margarine especially, reversion takes place relatively more quickly because of the presence of moisture and other substances. While there is a decided advantage from an economic standpoint to employ soya bean oil in the food industries, primarily because of the abundance and ready sources and availability of such oil, nevertheless the problems encountered have acted as definite deterrents to the stimulation of such uses of soya bean oil.

I have discovered that, by treating soya bean oil with certain reagents in certain proportions and under proper temperature and pressure conditions, products are obtained which keep in good condition without reversion for periods of time substantially in excess of the time before reversion sets in without the treatment of my invention. The practical effect of this treatment is that the commercial utility of soya bean oil in the food industry is tremendously increased.

The improvement in the soya bean oil by reason of my treatment thereof manifests itself also in other respects, the most notable of which appears to lie in the reduction of color of the treated oil. As will be pointed out more fully hereinafter, in some instances this reduction in color is very substantial.

It is accordingly an object of my invention to improve soya bean oil, particularly to enhance its utility for use in food products.

Another object of my invention concerns itself with substantially extending the stability of "pre-reversion" period of soya bean oil.

Still another object of my invention resides in reducing the color of soya bean oil.

Another object of my invention deals with the provision of a novel method of treating soya bean oil to improve the same, particularly with reference to extending or prolonging the period preceding reversion or, in other words, the pre-reversion period.

Yet another object of my invention is the provision of a novel soya bean oil possessing the property of keeping for relatively long periods of time without development of off-flavors.

Another of the objects of my invention is concerned with the development of a method of treating soya bean oil to improve the same, especially with regard to extending the period preceding reversion, which method may easily be combined and coordinated with present practices in the art of treating edible oils and fats, particularly with respect to the refining thereof.

With these objects in view and others which will appear as the nature of my invention is made clear in the light of the following description, I shall address myself to fully explaining the various phases of my invention.

In general, my invention is predicated on the discovery that when phosphoric acid esters are added in very small amounts to soya bean oil and the oil is subjected to elevated temperatures, particularly under reduced pressures, in the presence of steam or other non-oxidizing vapor or gas, such as nitrogen or hydrogen, the resulting oil possesses new properties; its pre-reversion period is substantially prolonged and it undergoes a definite reduction in color. The steam or non-oxidizing gas serves to sweep out the volatile constituents of the oil undergoing treatment.

At this point, I wish to distinguish my present invention from certain known practices as evidenced, for example, by the patents to Eddy W. Eckey and Albert S. Richardson et al., numbered, respectively, 1,993,152 and 1,993,181. Each of these patents is concerned with retarding the oxidation of oils and fats and oleaginous materials generally, cottonseed oil being mentioned specifically, by the addition thereto of relatively small proportions of phosphoric acids and certain esters thereof. My invention is not to be confused therewith. In the first place my process is concerned with the treatement of soya bean oil which, by contrast with edible oils generally, presents peculiar and unusual problems which cannot be solved in ways applicable to edible oils and fats generally as a class. For example, refined and deodorized cottonseed oil, corn oil and sesame oil and their partially hydrogenated products are not subject to that kind of spoilage such as has been described above in connection with soya bean oil. In the second place, I have found it advisable that the soya bean oil and phosphoric acid ester be treated in an non-oxidizing atmosphere such as steam, nitrogen, carbon dioxide or the like, particularly under reduced pressure, and at temperatures of the order of those employed in edible oil deodorization commercial processes, namely, about 420° F. to 500° F., preferably at the higher temperatures. Under these conditions, a reaction takes place between some of the constituents of the soya bean oil and the phosphoric acid ester and it is my belief that it is this reaction product which forms at the elevated temperatures which is responsible for the prolongation of the good flavor and retards the development of the so-called "beany" or "fishy" flavor in the soya bean oil. The use of elevated temperatures also serves, with the steam or other non-oxidizing gas, to deodorize the bean oil and to volatilize any undesirable constituents formed by the interaction of the phosphoric acid ester and some of the constituents of said oil. Although I have not yet fully ascertained the mechanism of the reaction which takes place and appears to account for this unusual and unexpected retardation of the development of "beany" or specific off-flavors in the treated soya bean oil, it is my present theory that the phosphoric acid ester reacts with the conjugated double bonds of the coloring matter, such as carotene, present in the soya bean oil. I postulate this theory because, in general, simultaneously with the improvement of the keeping properties or prolongation of the pre-reversion period of the soya bean oil, there is also a bleaching effect upon or reduction of color of said oil. While I am not to be bound by any theoretical considerations, I have offered the same as a possible explanation of why I obtain the results which I have already generally described and which will be more fully detailed hereinafter. At any rate, that a reaction takes place under the conditions of my treatment cannot be gainsaid since the mere addition of the phosphoric acid esters to soya bean oil does not serve to prolong or extend the prereversion period thereof to any noticeable or appreciable extent. The phosphoric acid esters used at the high temperatures under the conditions specified appear to exert a catalytic effect with a resultant marked improvement of the soya bean oil.

The phosphoric acid esters which I may utilize are varied and include glyceryl phosphoric acid and many other phosphoric acid esters including those disclosed in the patents to Benjamin R. Harris, Nos. 2,026,785 and 2,052,029. These compounds are, in general, phosphoric acid esters of relatively high molecular weight alkyl or acyl derivatives of polyhydroxy substances. Of exceptional utility for my present purposes are the special types of phosphoric acid esters prepared by a "pretreatment" process followed by an esterification reaction to produce esters of phosphoric acids. Of this latter class of compounds, unusually satisfactory results have been obtained by the utilization of phosphoric acid esters prepared from mono-glycerides, diglycerides, and mixtures of monoglycerides and diglycerides, the fatty acid radical or radicals of which contain, as obtained from animal and vegetable oils and fats or from other sources, from 12 up to and including 18 carbon atoms, such, for example, as those prepared by re-esterification of cottonseed oil or partially hydrogenated cottonseed oil with glycerine and treated to obtain phosphoric acid esters. These special types of esters of phosphoric acids are disclosed in the copending applications of Benjamin R. Harris, Serial No. 56,724, filed December 30, 1935, and Serial No. 125,272, filed February 11, 1937. In order that those skilled in the art may better understand my invention without the necessity of referring to the copending applications of Benjamin R. Harris, referred to hereinabove, the following examples are given by way of illustration of methods of preparing said special esters. Reference, however, may also be had to the patent to Benjamin R. Harris, No. 2,025,986, wherein such special esters are shown for use in confection compositions.

Example I

*Preparation of ester.*—Six hundred (600) pounds of cottonseed oil hydrogenated to an iodine value of about 69 and 150 pounds of normally liquid cottonseed oil are heated together with 250 pounds of glycerine to about 200 degrees F. without stirring. Twelve (12) ounces of sodium hydroxide flakes are added and the temperature raised to 485 degrees F. and held at that temperature for two hours with stirring. A non-oxidizing atmosphere, such as $CO_2$, is maintained during the heating and the cooling to about 200 degrees F. On standing, glycerine separates out and is removed. Glycerine still suspended may be centrifuged out. The resulting product contains a mixture of mono- and di-glycerides of the fatty acids present in the hydrogenated cottonseed and normally liquid cottonseed oils.

*Pre-treatment with $P_2O_5$.*—Seven hundred (700) pounds of the ester obtained in accordance with the above process are transferred to a jacketed kettle. Seventy-five (75) pounds of finely divided $P_2O_5$ are added at a temperature of 160° F. with thorough agitation. The temperature rises to about 200° to 210° F. Steam is then circulated in the jacket to raise the temperature to 240° F. and the mass is maintained at that temperature for one-half hour with constant agitation. The reaction product is then centrifuged to remove the $P_2O_5$ and adhering organic matter (about 150 pounds of a very viscous brown mass are centrifuged out; practically no $P_2O_5$ enters into chemical combination with the ester in this pretreatment stage).

*Esterification with $P_2O_5$.*—The clear liquid obtained in the pretreatment step is transferred back to the kettle and cooled to about 155° F. Seventy-five (75) pounds of finely divided $P_2O_5$ are then added with agitation. At the same time cold water is circulated in the jacket. The temperature rises to about 180° F. to 190° F. in about five to ten minutes, remains at that temperature for several minutes, and then begins to cool. It is then allowed to cool to about 150° F. The total time required from the time the $P_2O_5$ is added to when it reached maximum temperature and is allowed to cool to 150° F. is about one-half hour. This is the case when fine $P_2O_5$ is used. If coarse $P_2O_5$ is used, it is added at 160° F. The temperature rises slowly to 210° F. over a period of twenty minutes. There is then a tendency for the temperature to rise suddenly. This rise is checked by circulating cold water in the jacket. The maximum temperature obtained in that way is about 214° F. to 215° F. and the reaction mixture remains at that temperature several minutes. It is then allowed to cool to about 150° F. This takes another twenty minutes. A dark reddish brown viscous liquid is thus obtained. If desired, the product may be neutralized as, for example, in the following manner:

*Neutralization.*—One-half of the reaction product is removed and the half remaining in the kettle is cooled to 120° F. Forty (40) pounds of finely divided anhydrous sodium carbonate are added at one time with continued agitation. The temperature may rise as high as 168° F. over a period of one-half hour. It should not be allowed to rise any higher. In most cases it goes up to about 160° F. It is then raised to 168° F. and kept at that temperature for about one-half hour, with continuous agitation. There is considerable efferverscence, but not as copious, violent or troublesome as when the pretreatment step is not used. The product is immediately centrifuged to remove excess sodium carbonate.

Example II

Substantially water free glycerine is polymerized, preferably with the aid of an alkali catalyst, until it has an average molecular weight corresponding to a diglycerol. 166 parts of the polymerized product, 180 parts of oleic acid, and 105 parts of stearic acid of good commercial grade are mixed together and heated to a temperature of about 220° to 225° C. and maintained at that temperature for approximately two hours, the reaction mixture in the meantime being continuously stirred. Atmospheric oxygen is kept out of contact with the mixture, preferably by maintaining an atmosphere of an inert gas at the surface, for example by bubbling carbon dioxide through the mixture continuously. The reaction should be allowed to continue until the acidity of the mixture is below 1%, the time, temperature and conditions described usually being suitable to produce this result. The product is then allowed to stand and any unreacted polyglycerol present is allowed to settle out.

To 450 parts of the mixed polyglycerol esters prepared as in the preceding paragraph, while at a temperature of approximately 60° C., 75 to 100 parts of fine phosphorus pentoxide are slowly added. A jacketed vessel may be employed to control temperature. The product is heated to approximately 120° C. and kept at that temperature for about twenty minutes. It is then removed from the vessel and centrifuged to remove insoluble materials, consisting for the most part of phosphorus pentoxide and adhering or loosely combined organic matter.

400 parts of the pretreated product are returned to the jacketed vessel and at 50° C. fifty parts of fine phosphorus pentoxide are added slowly thereto. The reaction mixture is heated to about 70° C. and the temperature then rises to about 95° C. The product is kept at this temperature for a few minutes, the total time for the entire esterification step being about twenty-five minutes.

The esterified product, if neutralization is desired, is neutralized suitably either by the use of sodium carbonate, as described in Example I, or by the use of ammonia, or by employing any other suitable alkaline organic or inorganic neutralizing agent. In general, very good results are obtained if the hydrogen ions of the hydrophile phosphate group are replaced by either sodium or ammonium ions.

Example III

*Pre-treatment.*—450 parts of a product consisting essentially of mono-glycerides of cottonseed oil fatty acids were admixed with 120 parts of sodium bi-sulphate ($NaHSO_4$), heated, with stirring, to about 120 degrees C., and kept at that temperature for about 20 minutes, the stirring being more or less continuous. When the stirring was stopped, a heavy, syrupy liquid collected rapidly at the bottom, leaving a clear supernatant liquid, the latter being separated by decantation.

*Esterification.*—380 parts of the decanted liquid obtained above were mixed with 42 parts of finely divided $P_2O_5$ at about 50 degrees C. and the mixture was heated, with stirring, to 105 degrees C. A reaction set in, the temperature rising to 125 degrees C. The reaction mass was then allowed to cool.

(Note.—The above process was also carried out in the same manner as described above except that, in the pre-treatment, in one instance 75 parts of sodium bi-sulphate and in another instance 38 parts of sodium bi-sulphate were employed. In each case it was necessary, in the subsequent reaction with $P_2O_5$ to raise the temperature higher than 105 degrees C. before a reaction set in. In the process in which 75 parts of sodium bi-sulphate were employed, it was necessary to raise the temperature to 125 degrees C. after which said temperature rose spontaneously to 140 degrees C. In the process employing 38 parts of sodium bi-sulphate, even when the temperature was raised to 150 degrees C. there was no spontaneous rise in temperature.)

Example IV

*Pre-treatment.*—450 parts of a diglyceride of a higher fatty acid were pre-treated with 60 parts of sodium-bi-sulphate at 125 degrees C. for approximately one-half hour. The mass was permitted to settle and a clear liquid decanted.

*Esterification.*—380 parts of the decanted liquid were reacted with 40 parts of $P_2O_5$ at 50 degrees C. The mixture was heated to about 80 degrees C. after which the temperature spontaneously rose to about 90 degrees C. The reaction mass was then permitted to cool.

(Note.—The diglyceride was prepared from a mixture of 200 parts of hydrogenated cottonseed oil having an iodine value of 67 and 175 parts of corn oil, this mixture being heated in an atmosphere of $CO_2$ with 110 parts of glycerine and $\frac{1}{10}$ per cent sodium hydroxide (based on the weight of the oil) to 250 degrees C. and kept at that temperature for two hours.)

Generally speaking, crude soya bean oil, produced by the expeller process or by the solvent process, contains a fraction of one per cent of free fatty acids, this, however, being variable. Such oil is refined in accordance with conventional processes involving neutralization of the free fatty acids with alkali or alkaline materials, removal of the resulting soap, drying, and bleaching with such agents as fuller's earth or carbon black. The oil may then, if desired, be hydrogenated in accordance with known practice to produce a product having a melting point of about 95° F. to 100° F. whereby it may be employed as a constituent of margarine or dry bakery shortenings. If desired, the hydrogenated soya bean oil may be washed again with a slight amount of alkali and introduced into a deodorizing kettle and deodorized with superheated steam under reduced pressure.

I have found that I obtain excellent results with economy of treatment if the phosphoric acid esters in proper proportions are added to the soya bean oil just prior to the deodorization thereof with superheated steam under reduced pressure. The subjection of the soya bean oil, admixed with the phosphoric acid esters, to these conditions of temperature and reduced pressure produces a definite change in the oil in that some constituent or constituents of the soya bean oil which cause or promote reversion become fixed and inactive while undesirable constituents formed or present become volatilized, thereby producing a product which keeps in good condition for relatively long periods of time without development of oleo-like or fishy or grassy flavors.

It must not be inferred that my process is limited to the treatment of hydrogenated soya bean oil or that the phosphoric acid esters must be introduced into the oil at any particular phase of the process of treatment or refining thereof. My process is also applicable to the treatment of liquid or non-hydrogenated soya bean oil. Furthermore, the phosphoric acid esters may be added at any suitable stage of the process of treating the soya bean oil. It is only necessary that the mixture of the soya bean oil and the phosphoric acid ester be subjected to a temperature sufficiently high to react, as, for example, about 400° F. to 500° F. under reduced pressure for the requisite length of time, which will vary with the size of the batch undergoing treatment, generally a matter of one hour or several hours during which period the oil is also deodorized. While the soya bean oil admixed with the phosphoric acid ester could be subjected to the heat treatment in an inert or substantially non-oxidizing atmosphere, such as indicated above, followed by steam deodorization under reduced pressure at elevated temperatures of the character described, I have found it to be considerably more economical and somewhat better results are obtained if the treatment is effected as a part of and concomitant with the steam deodorization treatment to which the oils are subjected, the time being sufficiently long, generally six or seven hours in large scale commercial operations, so as to drive off undesirable volatile constituents present in the oil or which might be formed in the reaction.

The following examples are illustrative of methods of practicing my invention. It will be understood, however, that said examples are given by way of illustration only and are not to be construed as limitative of the full scope of my invention as taught herein.

*Example A*

To a partially hydrogenated soya bean oil there was added 0.02% by weight of the phosphoric acid ester produced in accordance with Example I hereinabove and the mixture was heated with superheated steam for six hours at a temperature of 500° F. at an absolute pressure of 7 mm. of mercury to remove undesired volatile constituents. In an accelerated test made by placing a sample of the oil thus treated in a bottle and exposing it to light, the oil kept in good condition for twelve days. A batch similarly treated but omitting the phosphoric acid ester and another batch similarly treated but utilizing 0.2% of said phosphoric acid ester kept only two days before reversion set in under the same accelerated test.

*Example B*

Crude soya bean oil was refined in the conventional way by neutralization with alkali, removal of the resulting soap, drying and bleaching. It was then mixed with 0.05% by weight of the phosphoric acid ester of Example III hereinabove and the mixture was heated at 490 degrees F. at a reduced absolute pressure of 9 mm. of mercury for a period of several hours until undesired volatile constituents were removed. In an accelerated test, as described in Example A, the oil thus treated has keeping qualities superior to a sample similarly treated but without the addition of the phosphoric acid ester.

*Example C*

To a soya bean oil partially hydrogenated so that it had a melting point of 100 degrees F. there was added 0.04% by weight of the phosphoric acid ester of Example IV hereinabove. The resulting mixture was then heated at 485 degrees F. with superheated steam under a reduced pressure of 10 mm. of mercury for several hours to remove undesired volatile constituents. In an accelerated test, as described in Example A, the treated oil kept in good condition about five times as long as a sample similarly treated but without the addition of the phosphoric acid ester.

The proportions of phosphoric acid esters employed are quite critical. In general I have found that if substantially in excess of 0.5% of the phosphoric acid ester, based on the weight of the soya bean oil, is employed the results obtained are not quite so satisfactory as when small proportions are utilized. The proportions vary somewhat with particular soya bean oils, and, as a general rule, liquid soya bean oil requires greater proportions of the phosphoric acid esters than is required in the treatment of hydrogenated or partially hydrogenated soya bean oil. Thus, for example, in the case of a partially hydrogenated soya bean oil I have obtained relatively unsatisfactory results with as high as 0.3% of some of the phosphoric acid esters whereas 0.5% of the same phosphoric acid esters utilized in liquid or non-hydrogenated soya bean oil showed a fair prolongation of the pre-revision period thereof. In general, bearing in mind the statements made above and the variability of different factors, including the extent of neutralization, as described below, I employ proportions ranging between about 0.0005% or 0.001% and 0.5% of the phosphoric acid esters, and preferably from 0.005 to 0.05%.

The phosphoric acid esters employed in my process are effective for my present purposes regardless of whether they are acid, neutral, or partially alkaline in reaction, it being understood, however, that they may differ somewhat in degree of efficacy. In general, I prefer to employ the partially neutralized esters of phosphoric acids, those having a pH of about 5.5 having been found to give excellent results. As illustrative of the effect of pH of the phosphoric acid ester upon the pre-reversion period of the soya bean oil, I call attention to the following results obtained in tests which I have conducted. Utilizing the phosphoric acid ester of Example I hereinabove, the pH of which was from 5 to 5.5, accelerated tests on a partially hydrogenated soya bean oil treated in accordance with my process showed the oil to have good keeping properties for from twelve to sixteen days. All conditions being otherwise the same, the use of said phosphoric acid ester neutralized so as to have a pH of 7.1 produced an oil which kept in good condition under accelerated tests for six days. Under the same conditions, the same phosphoric acid ester neutralized to a pH of 8.4 kept the oil in good condition of eight days. The blank kept in good condition for two days. In each case, aside from the blank of course, 0.05% of the phosphoric acid ester was employed. In general, less of the non-neutralized phosphoric acid esters is necessary to obtain good results than of the neutralized or partially neutralized esters and in some cases an amount of a neutralized product which gives good results will, if substituted by the same amount of the non-neutralized product give relatively poor results. Thus, for example, I have obtained excellent results using as low as 0.0005% of the non-neutralized product of Example I but percentages of 0.5% of the same non-neutralized product gave relatively poor results. However, 0.5% of the neutralized product of Example I again gave satisfactory results. It will be understood that the term "phosphoric acid ester" is intended to cover the free acid ester as well as the partially neutralized or completely neutralized products unless otherwise specifically stated.

I have referred hereinabove to the temperatures which are utilized in my process. It is evident that any temperature, sufficiently high to effect the reaction between the phosphoric acid esters and the soya bean oil but not so high as to have an undesirable effect on the oil or to cause objectionable decomposition to take place, may be employed. I have stated that temperatures of 400° F. to 500° F. have proven satisfactory. Excellent results have been obtained at about 430° F. to 500° F. In general, to reiterate, the temperature must be high enough to volatilize, with the superheated steam or the like, the undersirable volatile constituents present in the oil and those which may be formed as reaction products.

The degree of vacuum utilized is, of course, subject to variation. Excellent results have been obtained with absolute pressures of 7 to 15 mm. of mercury but the operative range extends beyond either limit. In general, other things being equal, at low pressures the quality of the products obtained is an inverse function of the pressure, i. e., the lower the pressure, the better the product.

As I have previously stated, concomitantly with the extension or prolongation of the pre-reversion period of the soya bean oil as a result of my treatment, there is, as a general rule, a reduction in color over and above that which is due to the steam deodorization treatment in those instances where I utilize my process in conjunction therewith. For example, with some partially hydrogenated soya bean oils having a melting point of about 100° F., the color has been reduced by my treatment from about 13 Yellow and 1.3 Red (Lovibond scale) to from 4 to 3 Yellow and about 0.4 to 0.3 Red. In some cases of the treatment of liquid soya bean oil, my process has reduced the color from 35 Yellow and 8 Red to 6 to 7 Yellow and 0.5 Red. I have found that some types of soya bean oil undergo somewhat of a bleaching or reduction in color during steam deodorization thereof when the phosphoric acid esters are not employed. However, such oils acquire a beany, fishy, grassy or oleo-like flavor relatively quickly. If, however, as I have described, the same oil is subjected to the same temperature and deodorization treatment but in the presence of the phosphoric acid esters incorporated therein prior to subjection to deodorization, there is an improvement not only in color but also in the keeping properties of the oil.

What I claim as new and desire to protect by Letters Patent of the United States is:

1. In a method of improving soya bean oil, particularly with respect to extending its pre-reversion period, the steps which comprise mixing said oil with not substantially in excess of 0.5% of a phosphoric acid ester, based on the weight of the oil, and heating the resulting mixture under reduced pressure at sufficiently high edible oil deodorization temperatures for a length of time sufficient to drive off undesirable constituents.

2. In a method of improving soya bean oil, particularly with respect to extending its pre-reversion period, the steps which comprise mixing said oil with between about 0.0005% and 0.5% of a phosphoric acid ester, based on the weight of the oil, and heating the resulting mixture under reduced pressure at a temperature between about 400° F. and 500° F. for a length of time sufficient to substantially deodorize the oil.

3. In a method of improving soya bean oil, particularly with respect to extending its pre-reversion period, the steps which comprise mixing said oil with not substantially in excess of 0.5% of a phosphoric acid ester, based on the weight of the oil, and heating the resulting mixture under reduced pressure and in the presence of superheated steam at edible oil deodorization temperatures for a length of time sufficient to substantially deodorize the oil.

4. In a method of improving soya bean oil, particularly with respect to extending its pre-reversion period, the steps which comprise mixing said oil with between about 0.0005% and 0.5% of a phosphoric acid ester, based on the weight of the oil, and heating the resulting mixture under reduced pressure and in the presence of superheated steam at edible oil deodorization temperatures for a length of time sufficient to substantially deodorize the oil.

5. The process of claim 1 wherein the phosphoric acid ester is a phosphoric acid ester of a polyhydroxy substance, the hydrogen of at least one hydroxy group of the polyhydroxy substance being replaced by a relatively long chain non-nitrogenous aliphatic lipophile radical.

6. The process of claim 2 wherein the phosphoric acid ester is a phosphoric acid ester of a polyhydroxy substance, the hydrogen of at least one hydroxy group of the polyhydroxy substance being replaced by a relatively long chain non-nitrogenous aliphatic lipophile radical.

7. The process of claim 3 wherein the phosphoric acid ester is a phosphoric acid ester of a polyhydroxy substance, the hydrogen of at least one hydroxy group of the polyhydroxy substance being replaced by a relatively long chain non-nitrogenous aliphatic lipophile radical.

8. The process of claim 4 wherein the phosphoric acid ester is a phosphoric acid ester of a polyhydroxy substance, the hydrogen of at least one hydroxy group of the polyhydroxy substance being replaced by a relatively long chain non-nitrogenous aliphatic lipophile radical.

9. The process of claim 1 wherein the phosphoric acid ester is formed by pretreating a relatively high molecular weight acyl or alkyl derivative of a polyhydroxy substance, having at least one free hydroxy group attached to the polyhydroxy nucleus, with a member of the group consisting of phosphorus pentoxide, alkali metal bisulphates, strong sulphuric acid, sulphur trioxide, pyrosulphuric acid, acid reacting salts of pyrosulphuric acid, and mixtures thereof, and then reacting the resulting product with a derivative of phosphorus capable of forming an ester of a phosphoric acid.

10. The process of claim 4 wherein the phosphoric acid ester is formed by pretreating a relatively high molecular weight acyl or alkyl derivative of a polyhydroxy substance, having at least one free hydroxy group attached to the polyhydroxy nucleus, with a member of the group consisting of phosphorus pentoxide, alkali metal bisulphates, strong sulphuric acid, sulphur trioxide, pyrosulphuric acid, acid reacting salts of pyrosulphuric acid, and mixtures thereof, and then reacting the resulting product with a derivative of phosphorus capable of forming an ester of a phosphoric acid.

11. The process of claim 1 wherein the phosphoric acid ester is formed by pretreating fatty acid esters of glycerine containing at least one free glycerine hydroxy group and wherein the fatty acid radical contains between twelve and eighteen carbon atoms, said pretreating agent being selected from the group consisting of phosphorus pentoxide, alkali metal bisulphates, strong sulphuric acid, sulphur trioxide, pyrosulphuric acid, acid reacting salts of pyrosulphuric acid, and mixtures thereof, then removing said pretreating agent and adhering material, and reacting the resulting pretreated product with phosphorus pentoxide.

12. The process of claim 4 wherein the phosphoric acid ester is formed by pretreating fatty acid esters of glycerine containing at least one free glycerine hydroxy group and wherein the fatty acid radical contains between twelve and eighteen carbon atoms, said pretreating agent being selected from the group consisting of phosphorus pentoxide, alkali metal bisulphates, strong sulphuric acid, sulphur trioxide, pyrosulphuric acid, acid reacting salts of pyrosulphuric acid, and mixtures thereof, then removing said pretreating agent and adhering material, and reacting the resulting pretreated product with phosphorus pentoxide.

13. The process of claim 1 wherein the phosphoric acid ester is prepared from a mixture of monoglycerides and diglycerides resulting from the re-esterification of cottonseed oil with glycerine, said ester being formed by pretreating said mixture of monoglycerides and diglycerides with a member selected from the group consisting of phosphorous pentoxide, alkali metal bisulphates, strong sulphuric acid, sulphur trioxide, pyrosulphuric acid, and mixtures thereof, then removing said pretreating agent and adhering material, and reacting the resulting pretreated product with phosphorous pentoxide.

14. The process of claim 4 wherein the phosphoric acid ester is prepared from a mixture of monoglycerides and diglycerides resulting from the re-esterification of cottonseed oil with glycerine, said ester being formed by pretreating said mixture of monoglycerides and diglycerides with a member selected from the group consisting of phosphorus pentoxide, alkali metal bisulphates, strong sulphuric acid, sulphur trioxide, pyrosulphuric acid, acid reacting salts of pyrosulphuric acid, and mixtures thereof, then removing said pretreating agent and adhering material, and reacting the resulting pretreated product with phosphous pentoxide.

15. The process of claim 1 wherein the phosphoric acid ester is prepared by pretreating a higher fatty acid of glycerine containing at least one free glycerine hydroxy group with a minor proportion of a member selected from the group consisting of phosphorus pentoxide, alkali metal bisulphates, strong sulphuric acid, sulphur trioxide, pyrosulphuric acid, acid reacting salts of pyrosulphuric acid, and mixtures thereof, said pretreating step being carried out at a temperature of the order of 100° C. or higher, then removing said pretreating agent and adhering material, and reacting the resulting pretreated product with a relatively small proportion of phosphorus pentoxide at a temperature not substantially in excess of 100° C.

16. The process of claim 4 wherein the phosphoric acid ester is prepared by pretreating a higher fatty acid ester of glycerine containing at least one free glycerin hydroxy group with a minor proportion of a member selected from the group consisting of phosphorus pentoxide, alkali metal bisulphates, strong sulphuric acid, sulphur trioxide, pyrosulphuric acid, acid reacting salts of pyrosulphuric acid, and mixtures thereof, said pretreating step being carried out at a temperature of the order of 100° C. or higher, then removing said pretreating agent and adhering material, and reacting the resulting pretreated product with a relatively small proportion of phosphorus pentoxide at a temperature not substantially in excess of 100° C.

17. The process of claim 1 wherein the soya bean oil, prior to treatment with the phosphoric acid ester, has been at least partially refined and hydrogenated.

18. The process of claim 4 wherein the soya bean oil, prior to treatment with the phosphoric acid ester, has been at least partially refined and hydrogenated.

19. Soya bean oil, having an improved color and a substantially extended pre-reversion period, comprising the reaction product, under reduced pressure and at deodorization temperatures, of soya bean oil and not substantially in excess of 0.5% of a phosphoric acid ester based on the weight of said oil.

20. Soya bean oil, having an improved color and a substantially extended pre-reversion period, comprising the reaction product, under reduced pressure, in the presence of super-heated steam, and at deodorization temperatures, of soya bean oil and between about 0.0005% and 0.5% of a phosphoric acid ester based on the weight of said oil.

21. Soya bean oil, having an improved color and a substantially extended pre-reversion period, comprising the reaction product, under reduced pressure and at deodorization temperatures, of soya bean oil and not substantially in excess of 0.5% of a phosphoric acid ester, based on the weight of said oil, wherein said ester is a phosphoric acid ester of a polyhydroxy substance, the hydrogen of at least one hydroxy group of said polyhydroxy substance being replaced by a relatively long chain non-nitrogenous aliphatic lipophile radical.

22. Soya bean oil, having an improved color and a substantially extended pre-reversion period and comprising the reaction product, under reduced pressure and at deodorization temperatures, of soya bean oil and not substantially in excess of 0.5% of a phosphoric acid ester, based on the weight of said oil, said phosphoric acid ester being formed by pretreating a relatively high molecular weight acyl or alkyl derivative of a polyhydroxy substance, having at least one free hydroxy group attached to the polyhydroxy nucleus, with a member of the group consisting of phosphorus pentoxide, alkali metal bisulphates, strong sulphuric acid, sulphur trioxide, pyrosulphuric acid, acid reacting salts of pyrosulphuric acid, and mixtures thereof, and then reacting the resulting product with a derivative of phosphorus capable of forming an ester of a phosphoric acid.

23. Soya bean oil, having an improved color and a substantially extended pre-reversion period, comprising the reaction product, under reduced pressure and at deodorization temperatures, of soya bean oil and not substantially in excess of 0.5% of a phosphoric acid ester, based on the weight of said oil, said ester being formed by pretreating fatty acid esters of glycerine containing at least one free glycerine hydroxy group and wherein the fatty acid radical contains between twelve and eighteen carbon atoms, said pretreating agent being selected from the group consisting of phosphorus pentoxide, alkali metal bisulphates, strong sulphuric acid, sulphur trioxide, pyrosulphuric acid, acid reacting salts of pyrosulphuric acid, and mixtures thereof, then removing said pretreating agent and adhering material, and reacting the resulting pretreated product with phosphorus pentoxide.

24. Soya bean oil, having an improved color and a substantially extended pre-reversion period, comprising the reaction product, under reduced pressure and at deodorization temperatures, of soya bean oil and not substantially in excess of 0.5% of a phosphoric acid ester, based on the weight of said oil, said ester being prepared from a mixture of monoglycerides and diglycerides resulting from the re-esterification of cottonseed oil with glycerine, said ester being formed by pretreating said mixture of monoglycerides and diglycerides with a member selected from the group consisting of phosphorus pentoxide, alkali metal bisulphates, strong sulphuric acid, sulphur trioxide, pyrosulphuric acid, acid reacting salts of pyrosulphuric acid, and mixtures thereof, then removing said pretreating agent and adhering material, and reacting the resulting pretreated product with phosphorus pentoxide.

25. Soya bean oil, having an improved color and a substantially extended pre-reversion period, comprising the reaction product, under reduced pressure and at deodorization temperatures, of soya bean oil and not substantially in excess of 0.5% of a phosphoric acid ester, based on the weight of said oil, said ester being prepared by pretreating a higher fatty acid ester of glycerine containing at least one free glycerine hydroxy group with a minor proportion of a member selected from the group consisting of phosphorus pentoxide, alkali metal bisulphates, strong sulphuric acid, sulphur trioxide, pyrosulphuric acid, acid reacting salts of pyrosulphuric acid, and mixtures thereof, said pretreating step being carried out at a temperature of the order of 100° C. or higher, then removing said pretreating agent and adhering material, and reacting the resulting pretreated product with a relatively small proportion of phosphorus pentoxide at a temperature not substantially in excess of 100° C.

26. Partially hydrogenated soya bean oil, having an improved color and a substantially extended pre-reversion period, comprising the reaction product, under reduced pressure and at deodorization temperatures, of soya bean oil and not substantially in excess of 0.5% of a phosphoric acid ester, based on the weight of said oil.

27. Partially hydrogenated soya bean oil, having an improved color and a substantially extended pre-reversion period, comprising the reaction product, under reduced pressure, in the presence of super-heated steam, and at deodorization temperatures, of soya bean oil and between about 0.0005% and 0.5% of a phosphoric acid ester, based on the weight of said oil.

28. The method of improving soya bean oil, particularly with respect to extending its pre-reversion period, which comprises mixing said oil with not substantially in excess of 0.5% of a phosphoric acid ester of a higher molecular weight alkyl or acyl derivative of a polyhydroxy substance, and heating the resulting mixture under reduced pressure at edible oil deodorization temperatures to remove volatile constituents, the percentage of said phosphoric acid being based on the weight of the oil.

29. The method of improving soya bean oil, particularly with respect to extending its pre-reversion period, which comprises mixing said oil with between about 0.0005% and 0.5%, based on the weight of the oil, of a phosphoric acid ester of a higher molecular weight alkyl or acyl derivative of a polyhydroxy substance, and heating the resulting mixture, under reduced pressure, at a temperature between about 400° F. and 500° F. to remove volatile constituents.

30. The method of improving soya bean oil, particularly with respect to extending its pre-reversion period, which comprises mixing said oil with between about 0.0005% and 0.5%, based on the weight of the oil, of a phosphoric acid ester of a higher fatty acid monoglyceride or diglyceride, and heating the resulting mixture, under reduced pressure in the presence of super-heated steam at edible oil deodorization temperatures to remove volatile constituents.

31. Soya bean oil, having improved color and a substantially extended pre-reversion period, comprising the reaction product, under reduced pressure and at steam deodorization temperatures, of soya bean oil and not substantially in excess of 0.5%, based on the weight of the oil, of a phosphoric acid ester of a higher molecular weight alkyl or acyl derivative of a polyhydroxy substance.

32. The product of claim 31 wherein the ester is a phosphoric acid ester of a higher fatty acid monoglyceride or diglyceride.

33. The product of claim 31 wherein the soya bean oil is at least partially hydrogenated.

34. In a method of improving soya bean oil, particularly with respect to extending its pre-reversion period, the steps which include mixing said oil with from about 0.005% to 0.5% of a phosphoric acid ester, based on the weight of the oil, and heating the resulting mixture in a substantially non-oxidizing atmosphere at a temperature of the order of about 400° F. to 500° F. for a substantial period of time.

ALBERT K. EPSTEIN.